No. 747,686. PATENTED DEC. 22, 1903.
J. L. CREVELING.
SYSTEM OF ELECTRICAL REGULATION.
APPLICATION FILED FEB. 12, 1902.
NO MODEL. 3 SHEETS—SHEET 1.
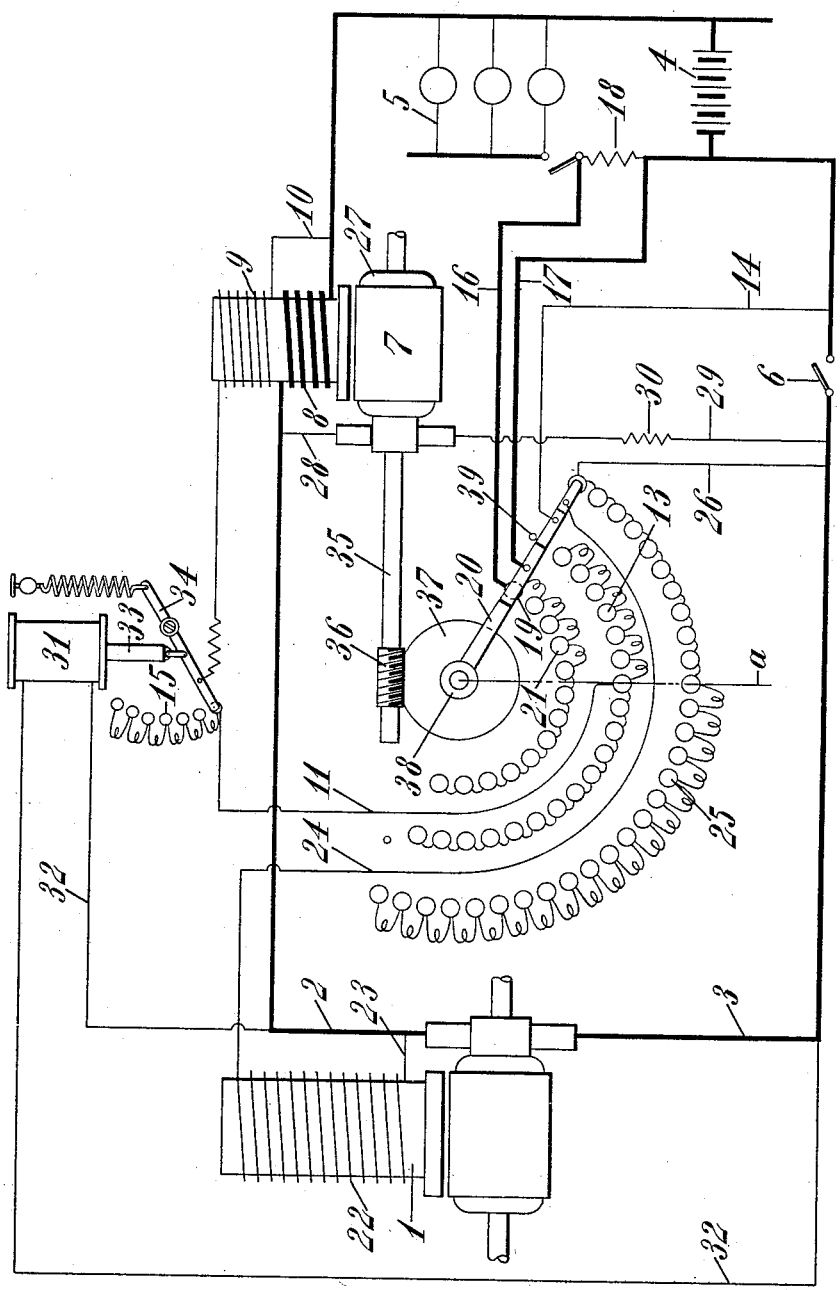
Fig. I.

No. 747,686. PATENTED DEC. 22, 1903.
J. L. CREVELING.
SYSTEM OF ELECTRICAL REGULATION.
APPLICATION FILED FEB. 12, 1902.
NO MODEL. 3 SHEETS—SHEET 2.
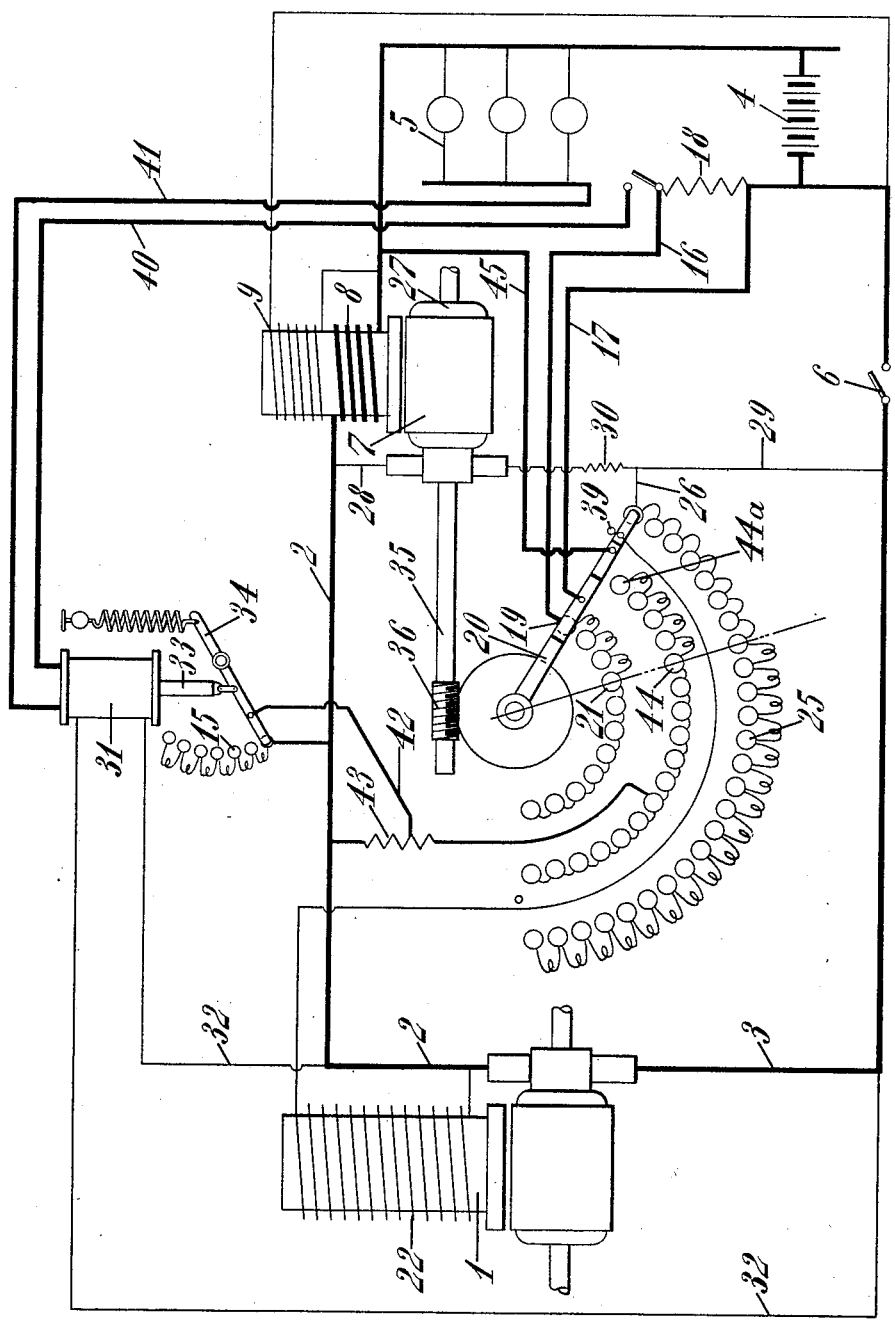
Fig. II.
WITNESSES: INVENTOR
E. J. Schroeder, Jr. John L. Creveling
BY
His ATTORNEYS.

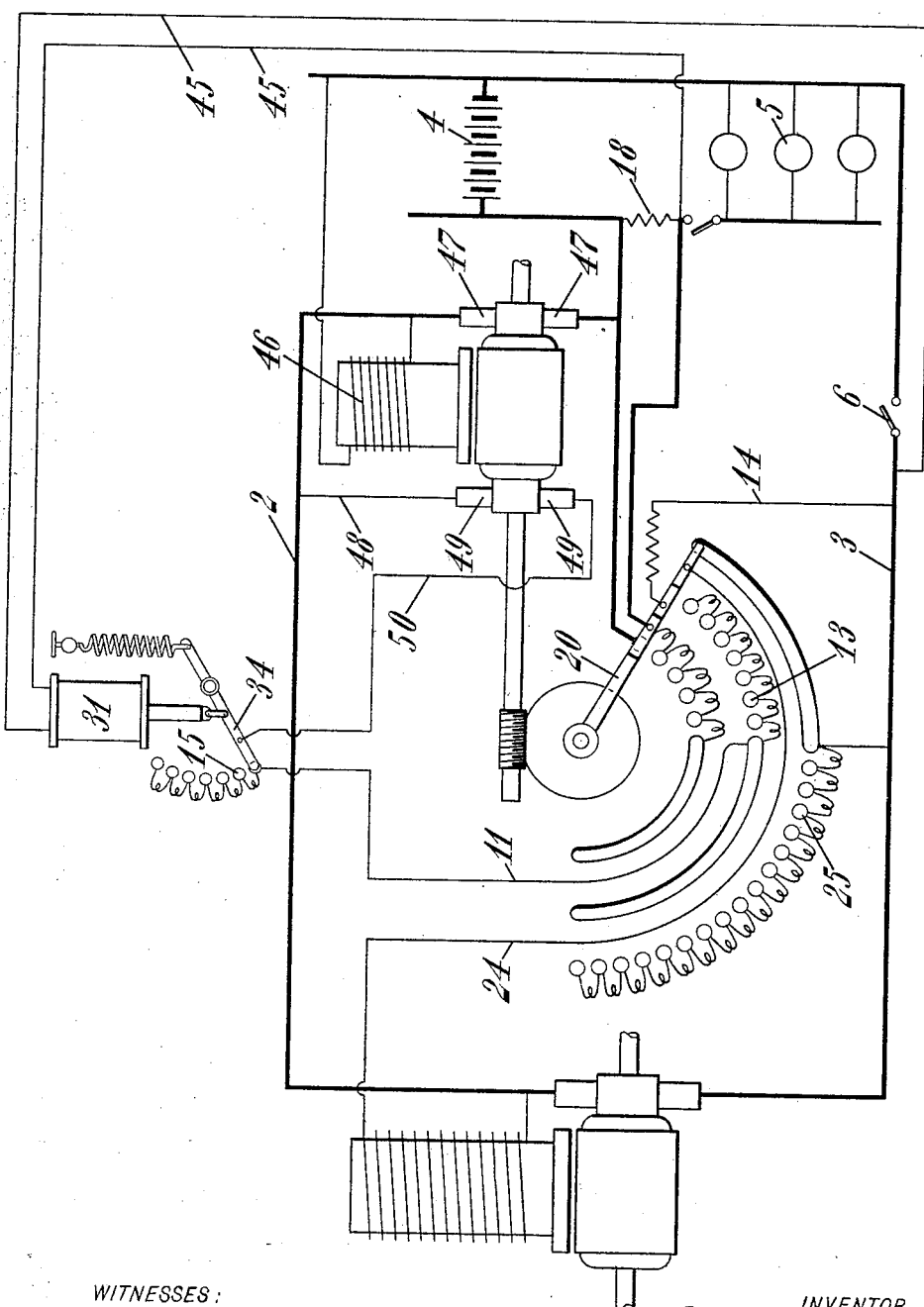

No. 747,686. Patented December 22, 1903.

UNITED STATES PATENT OFFICE.

JOHN L. CREVELING, OF NEW YORK, N. Y.

SYSTEM OF ELECTRICAL REGULATION.

SPECIFICATION forming part of Letters Patent No. 747,686, dated December 22, 1903.

Application filed February 12, 1902. Serial No. 93,775. (No model.)

*To all whom it may concern:*

Be it known that I, JOHN L. CREVELING, a citizen of the United States, residing in the borough of Manhattan, city, county, and State of New York, have invented certain new and useful Improvements in Systems of Electrical Regulation, of which the following is a specification.

My invention relates to systems of electrical regulation, and has for its primary object to produce means for charging storage batteries from a generator running at variable speeds and to maintain a desired constant voltage upon the work circuit, regulating the voltage directly by the output of the generator.

A further object of my invention is to produce a construction whereby when the batteries shall have reached a certain voltage—that is, when they have become practically charged—the charging rate will be automatically changed, it being well understood that the voltage necessary to charge the cells at the normal rate will remain almost constant until the cells are practically charged, when a considerable rise in voltage is necessary to maintain this normal charging-current. I have shown means which when this rise in voltage takes place operate to lessen the charging rate, thereby avoiding a useless waste of current and evaporation of electrolyte due to violent gasing of the cells.

My invention also, broadly considered, embodies a regulator adapted to maintain a constant current from a generator driven at variable speed and an interdependent regulator for determining the current which the regulator shall hold constant.

In the accompanying drawings I have shown three of several means for carrying out my invention.

In Figure I, I have shown means for carrying out my invention in which the regulation is effected from the field of the regulator-motor. In Fig. II, I have shown a similar arrangement, in which the construction is slightly modified; and in Fig. III, I have shown another arrangement embodying my invention, in which the regulation of the output or charging-current of the generator is effected from the armature-windings of the regulator-motor.

Similar characters of reference indicate similar parts in all the figures.

In the drawings, 1 indicates a generator driven at variable speeds. This generator in the present instance is driven from the axle of a moving car after the manner of the ordinary storage-battery car systems, 2 and 3 representing the generator-mains, which extend to a suitable storage battery 4 and lamp or translation circuit 5. A suitable line-switch 6 may be interposed in the generator main circuit.

7 is a regulator-motor, one of whose field-coils 8 is in the generator main circuit, and its other field-coil 9, which opposes the coil 8, is at predetermined times included in shunt to the battery-circuit through wires 10 11, rheostat 13, and wire 14. The circuit of the battery field-coil 9 also includes at predetermined times the rheostat 15, as will be explained. Included in the line 2 are suitable wires 16 17, one of which runs to the switch-arm 20 and the other to the first contact 19 of the rheostat 21. I have shown the generator 1 as being provided with a shunt-field 22, which is connected by a wire 23 to one of the generator-mains and through wire 24, rheostat 25, and wire 26 with the other generator-main. The armature 27 of the regulator-motor is connected across the dynamo-mains by wires 28 29 through a suitable resistance 30, preferably a variable resistance. A solenoid at 31 or other suitable device is shown as providing means whereby upon the rise of the batteries to a predetermined voltage the charging rate may be changed. In the various forms of my invention, which for the sake of convenience I have illustrated diagrammatically, I have shown a solenoid at 31 as performing this function. This solenoid at 31 is in Fig. I shown as connected in shunt across the dynamo-mains by the wires 32 and as provided with a core 33, operating a pivoted contact-arm 34, which coöperates with the rheostat 15.

In each of the figures I have shown a line *a*, which indicates the position of the switch-arm 20, where the field is receiving full current and the lamps have the proper amount of resistance in circuit therewith and the battery field-coil of the regulator-motor has the proper amount of resistance therein.

This position indicates the lowest speed at which the generator gives its normal output, which output remains constant throughout increases of speed.

The armature-shaft 35 of the regulator-motor is shown as provided with a worm 36, which meshes with a gear 37, which drives the arm 20, preferably by means of a frictional connection 38.

The operation of the device is as follows, the parts being supposed to be in the positions shown in the figures: The generator 1 is started up and upon reaching a critical speed, owing to the fact that the generator shunt-coil 22 receives full current the generator will have its normal voltage, the armature 27 of the regulator-motor also receiving current; but the field of the motor is not excited. When the voltage rises to a predetermined degree, the line-switch 6 closes the generator-circuit. When the generator-circuit has thus been completed, the field-coil 8 of the regulator-motor will receive any current delivered by the generator to the battery or consumption circuit. This current will tend to excite the field of the regulator-motor and cause the motor-armature to rotate, so as to move the switch-arm 20 to the left, which by its movement immediately cuts the regulator-motor field-coil 9 into circuit through the resistance 13 and introduces resistance into the lamp-circuit to compensate for the rise in voltage. As the output rises resistance will be cut out of the battery field-coil circuit 9 and more resistance will be cut into the lamp-circuit until the normal line $a$ is reached, when the lamps will have all of their resistance in circuit and the battery field-coil 9 of the regulator-motor will be receiving its full current. Upon any further rise in the output of the generator due to a further change in the speed the switch-arm 20 will begin to cut the resistance 25 into the field-circuit of the generator and to thereby cut down the field and maintain a practically constant output. This it does by the action of the coil 8 opposing the action of the coil 9 and overpowering it, thereby causing the switch-arm 20 to move farther to the left, so as to cut down the generator shunt-field upon an increase of output. So far the solenoid 31 has not come into action and the cells were being charged at their normal rate; but let it be supposed that this charging be continued until the cells have become nearly charged, so that a considerable rise in voltage will be necessary to maintain this normal rate. When this occurs the solenoid will operate to change the rate to lessen it, thereby avoiding useless waste of current and evaporation of electrolyte due to violent gasing of the cells. This is accomplished upon a rise in voltage by the solenoid 31 raising its core 33, so as to cut a portion or all of the resistance 15 into the circuit of the field-coil 9 of the regulator-motor. This will weaken the field-coil 9, and the coil 8 will cause the armature 7 of the regulator-motor to revolve in such direction as to decrease the output of the generator until the effect of the current flowing from the generator through the coil 8 will practically balance the reduced effect of coil 9.

In Fig. II, I have shown a similar arrangement, in which similar letters of reference indicate corresponding parts. In this figure the solenoid 31 is shown as having an opposing winding in circuit through wires 40 41 in the lamp-circuit and operates to vary the resistance 15, which by the wire 42, resistance 43, rheostat 44, and wire 45 is in shunt with the coil 8 of the regulator-motor after the arm 20 has come in contact with the end contact 44ª of the rheostat 44. In this form of my invention the charging rate is determined by the solenoid 31 and is varied by varying the effect of the coil 8 by placing more or less resistance in shunt therewith. The function of the opposing winding 40 and 41 upon the solenoid is practically as follows: When the lamp-circuit is open, as indicated in the figure, no current will flow through the wires 40 and 41 and the operation of the solenoid 31 will be as outlined with regard to Fig. I. Should the batteries have been fully charged and the solenoid 31 have caused the charging rate to have been lessened, the closing of the lamp-switch will cause the lamp-current to flow through the differential winding 40 41 of the solenoid 31, causing the generator to deliver its full normal output so long as the lamp-circuit remains closed.

In Fig. III, I have shown another construction. In this figure the solenoid 31 is in shunt to the generator-circuit by wires 45 in series with the resistance of the lamp-circuit. The regulator-motor is provided with a field-coil 46, which is normally in shunt to the battery-circuit, and is provided with an armature having double windings which oppose each other. One of these windings is connected through the brushes 47 in series with the generator-mains. The other winding of the armature is connected in circuit as follows: from the main 2 by wire 48 through brushes 49, by wire 50, through the arm 34, by wire 11, rheostat 13. The engaging section of the arm 20 is connected to the main 3, as by the wire 14. The object of connecting the solenoid 31 in series with the resistance in the lamp-circuit is if the lamp-switch be open the resistance inserted in the lamp-circuit will not appreciably decrease the current through the solenoid 31, inasmuch as the lamp resistance is negligible as compared with that of the solenoid-winding, and so long as the switch in the lamp-circuit remains open the solenoid 31 will operate practically as if its windings were in shunt across the generator-mains. Now if the batteries are charged until the rise in voltage shall have caused the solenoid 31 to lower the charging rate and then the lamp-switch be closed the difference in potential of the lamp-mains will be considerably less than the generator-mains, owing to the lamp resistance, and consequently the strength of the solenoid 31 will be decreased, thus allowing the generator to deliver its full normal output. The operation of this form of my invention will be readily understood from the foregoing, the charging rate being regulated at the proper time by the solenoid 31, which operates to introduce the resistance 15 into the circuit of the regulator-motor armature-winding in circuit with the brushes 49.

Having described my invention, what I claim, and desire to secure by Letters Patent, is—

1. In a system of electrical distribution the combination with a generator adapted to be driven at variable speeds and a storage battery charged thereby of a regulator adapted to maintain given charging-currents throughout changes in speed of the generator and means operated by changes in the difference of potential of the battery determining the said charging-currents.

2. In a system of electrical distribution the combination of a generator and accumulator and automatic means including a device operated by difference of potential determining the charging rate with means maintaining the said charging rate throughout changes in speed of the generator until a change of voltage of the battery causes a change in the charging rate.

3. In a system of electrical distribution, the combination of a generator, automatic means for maintaining the output of the generator practically constant throughout changes in speed and electromagnetic means determining the said output to be maintained.

4. In a system of electrical distribution, the combination of a generator, an accumulator, automatic means for maintaining the current output of the generator practically constant and automatic means determining the said current to be maintained.

5. In a system of electrical distribution, the combination of a generator, an accumulator charged thereby, means for maintaining the current output of the generator practically constant throughout changes in speed and automatic means controlled by voltage of the accumulator for altering the current upon changes in voltage of said accumulator.

6. In a system of electrical distribution, the combination of a generator, an accumulator, means for maintaining a desired current output of the generator and automatic means, dependent upon the voltage of the accumulator, determining the said output.

7. In a system of electrical distribution, the combination of a generator, an accumulator charged thereby, a regulating device in circuit with the generator for controlling the current output of the generator, and automatic means governed by the voltage for determining the said current output.

8. In a system of electrical distribution, the combination of a generator, an accumulator, a regulating device for regulating the output of the generator and supplemental means controlling the regulating device, to determine the said output.

9. A system of distribution comprising a generator, an external circuit, and a regulator-motor having a plurality of windings and a rotating member, the said rotating member tending to rotate to cause a magnetic balance to be set up or preserved between two of the windings and means for varying the current in one of the last-named windings upon a rise in voltage.

10. A system of distribution comprising a generator, an external circuit and a regulator-motor having a plurality of windings, and a rotating member, the said rotating member tending to cause a magnetic balance to be set up or preserved between two of the windings, and means for varying the effect of one of said last-named windings upon a rise in voltage.

11. An electric regulator, comprising a plurality of windings, two of which are traversed by substantially constant currents, and one of which is traversed by the current to be regulated, and means for automatically determining one of the said constant currents.

JOHN L. CREVELING.

Witnesses:
GEO. E. MORSE,
F. E. KESSINGER.